(12) United States Patent
Nakajima

(10) Patent No.: US 10,970,008 B2
(45) Date of Patent: Apr. 6, 2021

(54) PRINTING APPARATUS, CONTROL METHOD FOR PRINTING APPARATUS, AND STORAGE MEDIUM

(71) Applicant: CANON KABUSHIKI KAISHA, Tokyo (JP)

(72) Inventor: Satoru Nakajima, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/502,855

(22) Filed: Jul. 3, 2019

(65) Prior Publication Data

US 2020/0026476 A1 Jan. 23, 2020

(30) Foreign Application Priority Data

Jul. 23, 2018 (JP) .............................. JP2018-137628

(51) Int. Cl.
*G06F 3/12* (2006.01)
(52) U.S. Cl.
CPC ............ *G06F 3/1205* (2013.01); *G06F 3/126* (2013.01)
(58) Field of Classification Search
CPC ................................................... G06F 3/1205
USPC ......................................................... 358/1.15
See application file for complete search history.

(56) References Cited

U.S. PATENT DOCUMENTS

| 2005/0179944 | A1* | 8/2005 | Gassho | G06F 3/1203 |
| | | | | 358/1.16 |
| 2006/0221391 | A1* | 10/2006 | Okazawa | G06F 3/1204 |
| | | | | 358/1.15 |
| 2007/0273923 | A1* | 11/2007 | Kimura | G06F 3/1222 |
| | | | | 358/1.15 |
| 2012/0086977 | A1* | 4/2012 | Hotta | H04N 1/32325 |
| | | | | 358/1.15 |
| 2013/0016388 | A1* | 1/2013 | Amano | G06F 3/1204 |
| | | | | 358/1.14 |

FOREIGN PATENT DOCUMENTS

JP 2014-237305 A 12/2014

\* cited by examiner

*Primary Examiner* — Jacky X Zheng
(74) *Attorney, Agent, or Firm* — Canon U.S.A., Inc. IP Division

(57) ABSTRACT

A printing apparatus performs control for printing the print data, in a case where the print data for which the logic print queue name is designated is received in a state where the forced reservation function is enabled, based on a print setting registered in association with the designated logic print queue name.

12 Claims, 17 Drawing Sheets

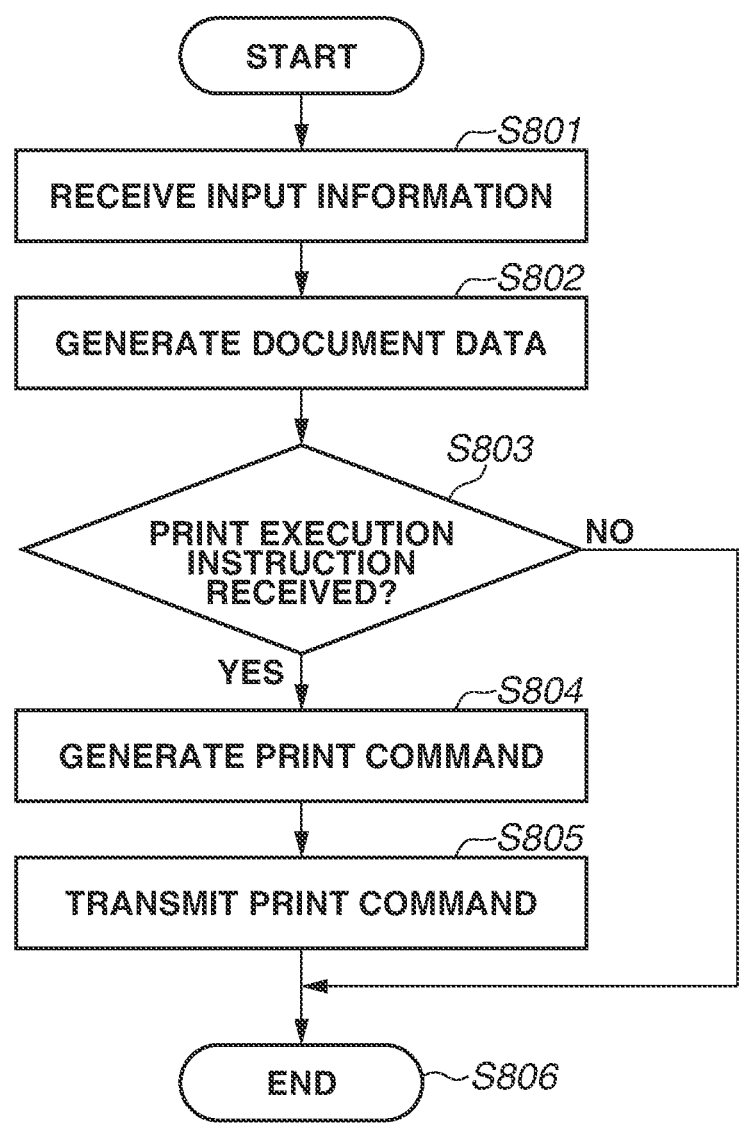

lpr -S 192.168.8.16 -P print02 c:\work\Bill.pdf
 908         909            910          911

FIG.12

UserA:

| Date and Time | IP Address | Storage Location | Print Job Name | Print Setting |
|---|---|---|---|---|
| 2016/4/10 10:34:45 | 192.168.2.11 | /data/0015/xxx | AAA.txt | One-Sided 1 Copy Black & White |
| 2016/4/20 13:50:22 | 192.168.2.11 | /data/0591/yyy | BBB.pdf | Two-Sided 3 Copies Color |
| 2016/5/28 14:10:00 | 192.168.2.11 | /data/8125/zzz | CCC.doc | Two-Sided 5 Copies 2 in 1 Color |

| Logic Print Queue Name | Print Setting |
|---|---|
| print01 | One-Sided  1 Copy  Color Paper |
| print02 | Two-Sided  3 Copies  Black & White |
|  |  |

PRINTING APPARATUS, CONTROL METHOD FOR PRINTING APPARATUS, AND STORAGE MEDIUM

BACKGROUND

Field of the Disclosure

The present disclosure relates to a printing apparatus, a control method for a printing apparatus, and a storage medium.

Description of the Related Art

There is an image forming apparatus that has a function called forced reservation printing provided for the purpose of security. In a case where the forced reservation printing function is enabled, the image forming apparatus does not immediately output a print job input from a printer driver, and temporarily saves the print job in a hard disk area allocated for a queue for reserving a print job within the image forming apparatus. Upon login of a user, the image forming apparatus displays a list of print jobs of the user on an operation unit. When the user selects a print job from the list and provides an instruction for printing the selected print job, the image forming apparatus prints the print job.

There is an image forming apparatus in which a job that satisfies a certain condition may be subjected to processing other than saving without being reserved even if this forced reservation printing function is enabled, and permission for this processing can be set based on the authority of an administrator (Japanese Patent Application Laid-Open No. 2014-237305). This setting is called exception condition setting. Examples of an exception condition include an owner name of a print job, an Internet Protocol (IP) address of a transmission source, and a transmission protocol (such as Line Printer Remote (LPR) protocol or File Transfer Protocol (FTP)) of a print job. Examples of the processing other than saving include cancellation of a print job.

Meanwhile, there is an image forming apparatus that has a function called a logic print queue provided for the purpose of output from a core system. The core system inputs a print job into the image forming apparatus by designating a "logic print queue name". The image forming apparatus prints the print job received from the core system based on print setting that is made beforehand for each logic print queue name.

A case where the forced reservation printing function and the logic print queue function described above are provided in one image forming apparatus and used has not been expected. Thus, it has been necessary to consider how to handle a print job in a case where the print job is received from the core system in a state where the forced reservation printing function is enabled.

SUMMARY

According to embodiments of the present disclosure, a printing apparatus includes a memory storing instructions, and a processor executing the instructions causing the printing apparatus to receive print data, set whether to enable a reservation function that reserves the received print data without printing the print data at least until receipt of a print instruction from a user, irrespective of whether reserving is designated for the received print data, register print setting in association with a logic print queue name, and perform control for printing the print data, in a case where the print data for which the logic print queue name is designated is received in a state where the reservation function is enabled, based on the print setting registered in association with the designated logic print queue name.

Further features of the present disclosure will become apparent from the following description of exemplary embodiments with reference to the attached drawings.

BRIEF DESCRIPTION OF THE DRAWINGS

FIG. 8 is a flowchart illustrating processing for inputting a print job from a core system.

FIG. 12 is a diagram illustrating an example of a bibliographic information table.

FIG. 15 is a diagram illustrating an example of a logic print queue setting table.

DESCRIPTION OF THE EMBODIMENTS

Exemplary embodiments of the present disclosure will be described below with reference to the drawings. A method for outputting a print job according to a first exemplary embodiment will be described. In this method, in a case where a forced reservation printing function (hereinafter referred to as the forced reservation function) is enabled in one image forming apparatus, a print job for which a logic print queue is designated is output using a setting of the logic print queue, without being held.

Figure 1:
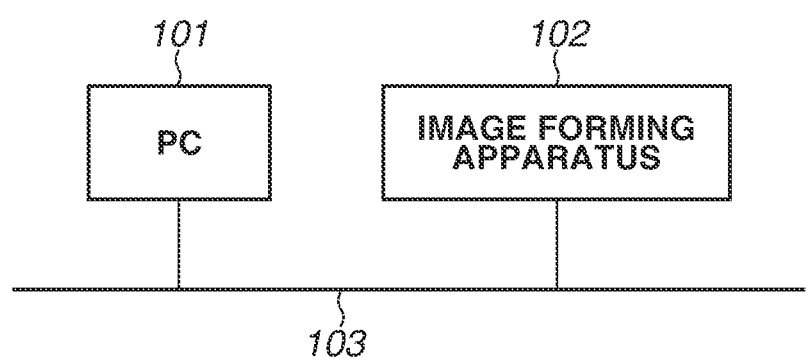
FIG. 1 is a block diagram illustrating an example of a network configuration.

FIG. 1 is a diagram illustrating an example of a network configuration. A personal computer (PC) 101 that inputs a print job and an image forming apparatus 102 that processes the input print job are connected to a local area network (LAN) 103. The number of the connected PCs and the number of the connected image forming apparatuses are not limited to this example. In the present exemplary embodiment, an input source of the print job is the PC 101, but it may also be an apparatus (e.g., a mobile terminal or another image forming apparatus) other than the PC.

Figure 2:
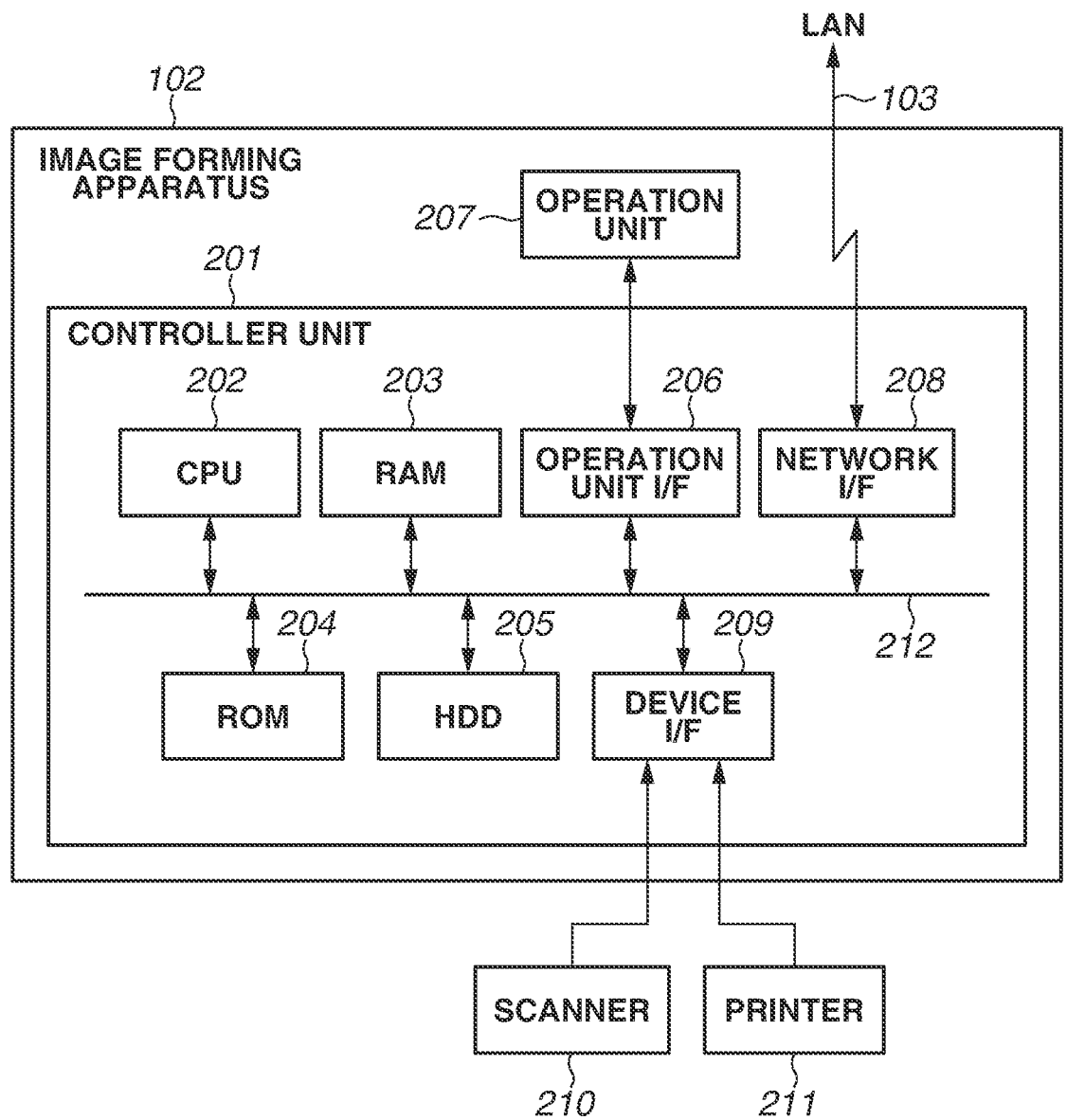
FIG. 2 is a block diagram illustrating an overall configuration of an image forming apparatus.

FIG. 2 is a block diagram illustrating an overall configuration of the image forming apparatus 102. The image forming apparatus 102 includes a controller unit 201. In the controller unit 201, a central processing unit (CPU) 202 is a computing unit that controls an entire system. A random access memory (RAM) 203 is a system work memory for the CPU 202 to operate and is an image memory for temporarily storing image data. Programs and data, such as an operating system, system software, and application software can also be loaded into the RAM 203. A read only memory (ROM) 204 stores a boot program for the system. A hard disk drive (HDD) 205 stores, for example, the operating system, the system software, the application software, image data, and setting data. An operation unit interface (I/F) 206 is an interface with an operation unit 207, and outputs, to the operation unit 207, information to be displayed on the operation unit 207. Further, the operation unit I/F 206 receives information input by a user via the operation unit 207. A network I/F 208 is connected to a network (LAN) 103 through which information is input and output to and from a PC or another image forming apparatus connected to the same LAN. A device I/F 209 connects a scanner 210, which is an image input device, and a printer 211, which is an image output device, to the controller unit 201 and performs input and output of image data. The above-described devices are arranged on a system bus 212.

Figure 3:
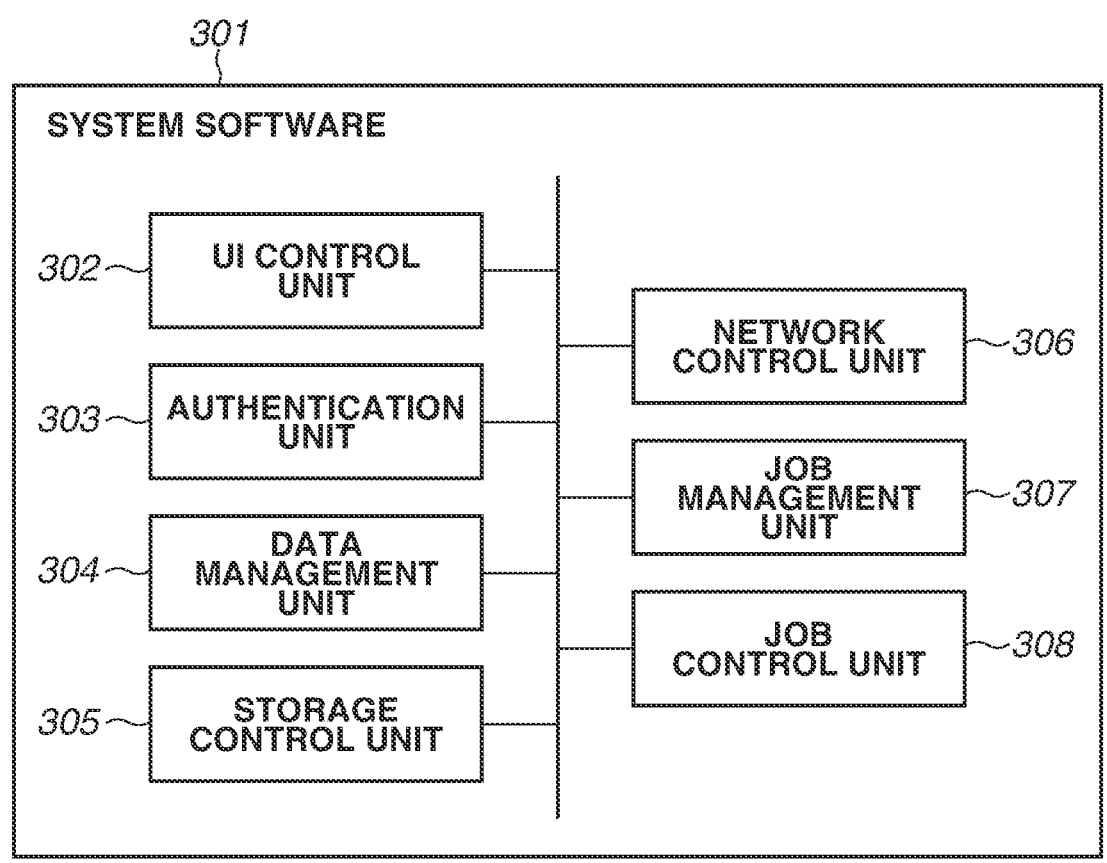
FIG. 3 is a block diagram illustrating a functional configuration of system software of the image forming apparatus.

FIG. 3 is a block diagram illustrating a functional configuration of system software 301 of the image forming apparatus 102. The system software 301 is stored in a storage unit that is any one of the RAM 203, the ROM 204, and the HDD 205, and is executed by the CPU 202.

A user interface (UI) control unit 302 receives information input by the user via the operation unit I/F 206, and transmits the received information to an authentication unit 303, a data management unit 304, and a job management unit 307. The UI control unit 302 also receives a response from the authentication unit 303, the data management unit 304, and the job management unit 307, and outputs information indicating the received response to the operation unit 207 via the operation unit I/F 206.

The authentication unit 303 performs authentication processing based on authentication information received from the UI control unit 302, and returns a result of the authentication processing.

The data management unit 304 receives a data writing/readout request from each of the UI control unit 302, the network control unit 306, and the job management unit 307, and transmits the data writing/readout request to a storage control unit 305. Further, the data management unit 304 receives a response from the storage control unit 305, and transmits information indicating the response to the UI control unit 302, the network control unit 306, and the job management unit 307.

The storage control unit 305 receives the data writing/readout request from the data management unit 304, performs data writing to and readout from the HDD 205, and returns a result of the data writing and readout to the data management unit 304.

A network control unit 306 receives, via the network I/F 208, a request from the PC 101 or an arbitrary image forming apparatus connected to the LAN 103. Then, the network control unit 306 requests the data management unit 304 and the job management unit 307 to perform processing based on the received request. The network control unit 306 also receives a response from the data management unit 304 and the job management unit 307, and transmits, via the network I/F 208, the received response to the PC 101 or the arbitrary image forming apparatus connected to the LAN 103.

The job management unit 307 receives a job execution request from the UI control unit 302 and the network control unit 306 and manages the relevant job. Then, the job management unit 307 requests a job control unit 308 to execute the job. Further, the job management unit 307 transmits a data writing/readout request to the data management unit 304. Then, the job management unit 307 receives a response from the data management unit 304 and the job control unit 308, and transmits a job status to the UI control unit 302 and the network control unit 306.

The job control unit 308 receives a job execution request from the job management unit 307, and controls operation of the scanner 210 and the printer 211 via the device I/F 209. The job control unit 308 also receives an operation status of the scanner 210 and the printer 211 via the device I/F 209, and transmits the received operation status to the job management unit 307.

Figure 4:
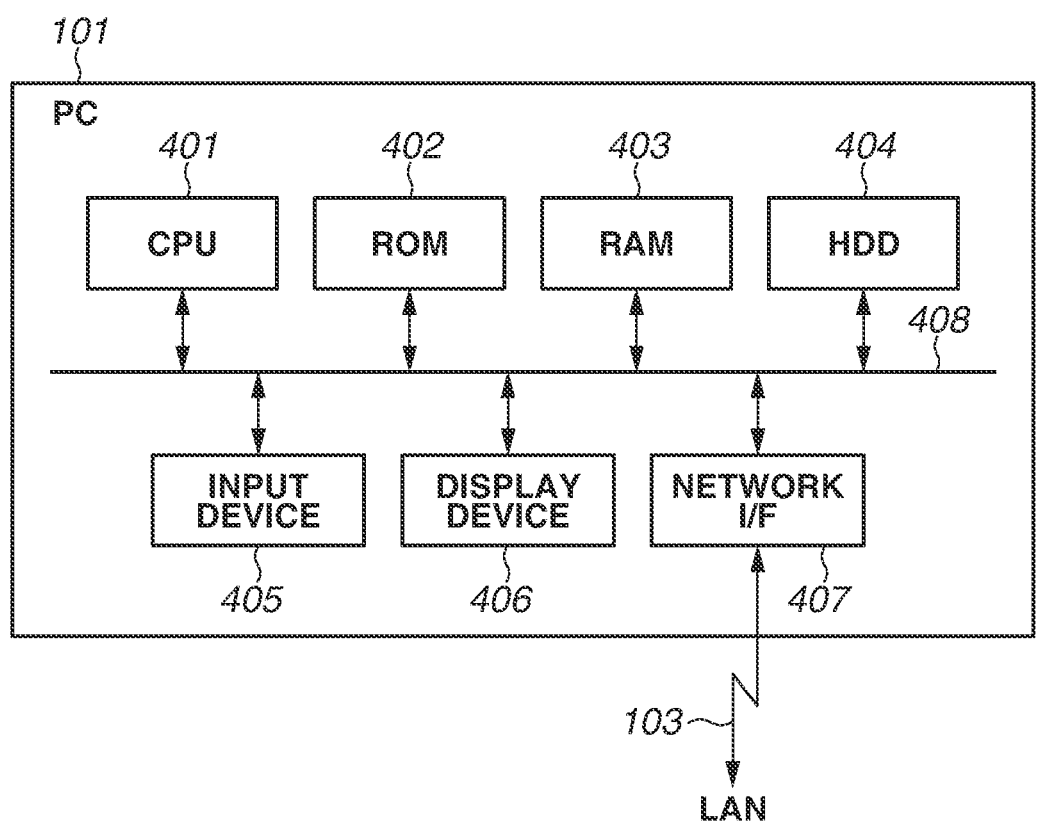
FIG. 4 is a block diagram illustrating an overall configuration of a personal computer (PC).

FIG. 4 is a block diagram illustrating an overall configuration of the PC 101. In the PC 101, a CPU 401 is a computing unit that controls the entire system. A ROM 402 stores a program and data related to each processing. A RAM 403 is a system work memory for the CPU 401 to operate, and is a storage memory that stores temporary data related to each processing. A HDD 404 stores, for example, a program and data related to each processing, temporary data, and application data. An input device 405 is a keyboard or a pointing device that receives an instruction input for the PC 101. A display device 406 displays an operation status of the PC 101 and information to be output by each program running on the PC 101. A network I/F 407 is connected to the network (LAN) 103 and through the network I/F 407, information is input to and output from another PC or another image forming apparatus connected to the same LAN. The above-described components are arranged on a system bus 408.

The CPU 401 performs processing based on an operating system (OS), a printer driver, and a program corresponding to an application that are stored in the HDD 404, so that a function (or processing) by the OS or the printer driver is implemented.

Figure 5:
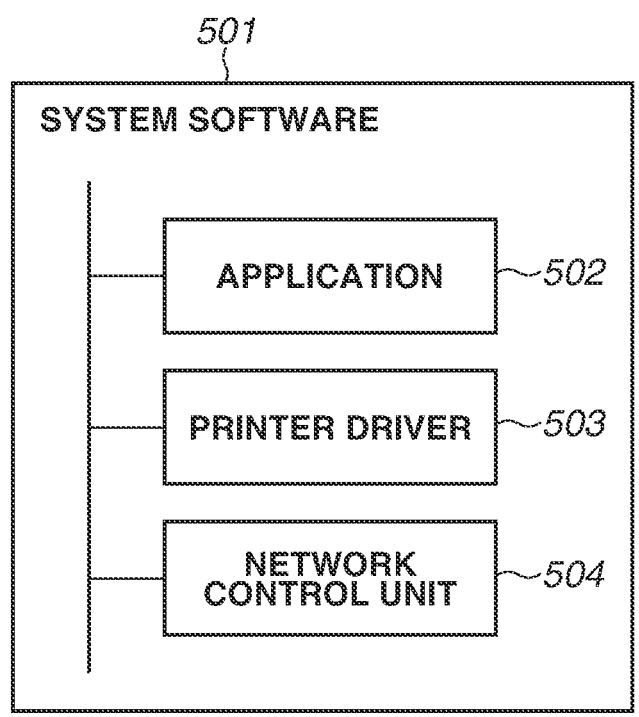
FIG. 5 is a block diagram illustrating a configuration of system software of the PC.

FIG. 5 is a block diagram illustrating a configuration of system software 501 of the PC 101. The system software 501 is stored in a storage unit that is any one of the ROM 402, the RAM 403, and the HDD 404, and is executed by the CPU 401.

The system software 501 includes an application 502, a printer driver 503, and a network control unit 504. The application 502 is, for example, a tool for creating and editing an image and a document using the input device 405 such as a pointing device and a keyboard while viewing the display device 406 of the PC 101. The application 502 is also a tool that refers to information in an image forming apparatus. A user creates data such as an image and a document using the application 502, and creates print command data using the printer driver 503. The created data and the print command data are transmitted to an apparatus that can perform printing such as the image forming apparatus 102, via the network control unit 504. The application 502 acquires information from the image forming apparatus 102 via the network control unit 504 and refers to the acquired information.

Figure 6:
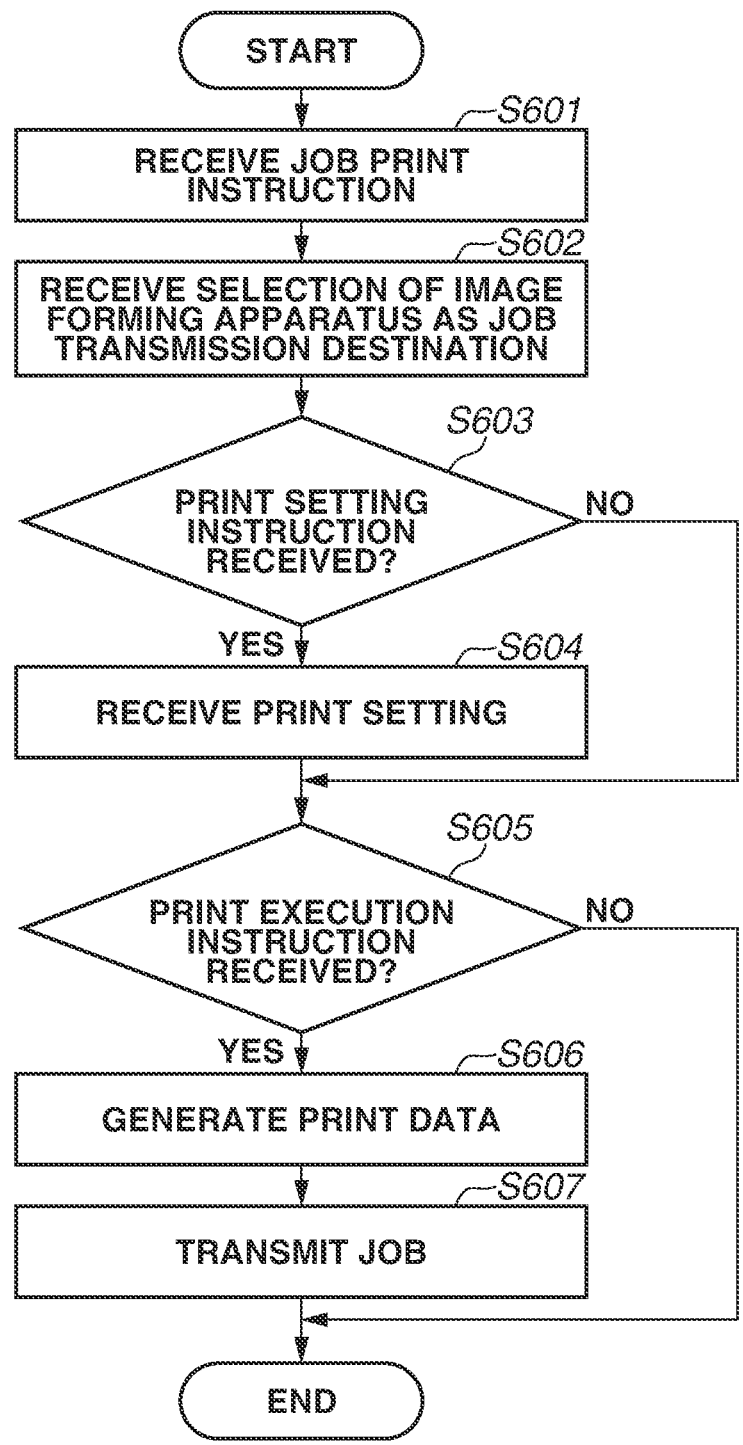
FIG. 6 is a flowchart illustrating processing for inputting a print job from an application by using a printer driver.

FIG. 6 is a flowchart illustrating processing for inputting a print job from an application by using a printer driver, and this processing is executed by the CPU 401 of the PC 101.

The user creates data such as an image or a document using the application 502, by using the input device 405 such as a pointing device and a keyboard, while viewing the display device 406, and then provides a print instruction. In step S601, the application 502 receives the print instruction. Then, the application 502 displays a screen for prompting the user to select a printer driver of an image forming apparatus to be a destination of transmission of a print job, on the display device 406. In step S602, the application 502 receives selection of the printer driver of the image forming apparatus 102 as an image forming apparatus to be a transmission destination of the print job. In step S603, the application 502 determines whether a print setting instruction is received from the user. If the print setting instruction is not received (NO in step S603), the processing proceeds to step S605. If the print setting instruction is received (YES in step S603), the application 502 displays a setting screen of the printer driver 503 corresponding to the image forming apparatus 102.

Figure 7A:
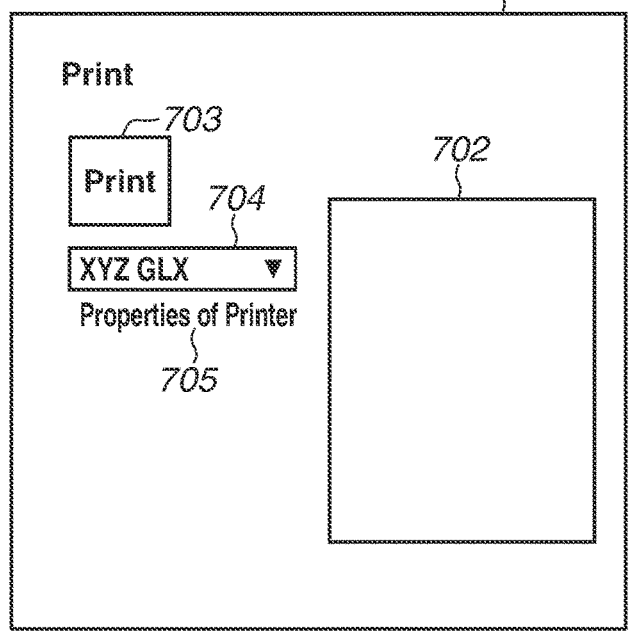
FIGS. 7A and 7B each illustrate an example of a screen that appears after a print instruction is provided.
Figure 7B:
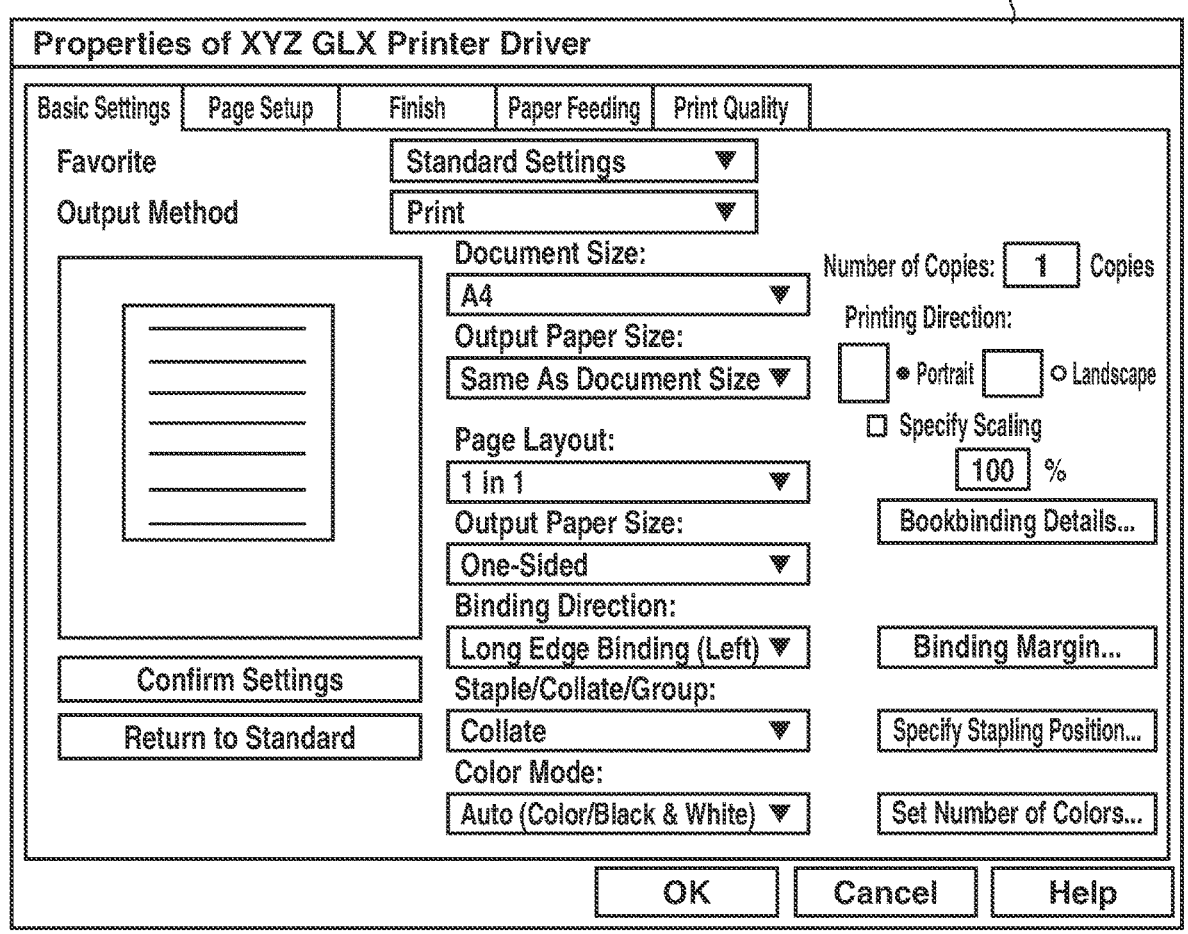

FIGS. 7A and 7B each illustrate an example of a screen that appears after the print setting instruction is provided. FIG. 7A is an example of a screen for prompting the user to select a printer driver of an image forming apparatus to be a destination of transmission of a job. A screen 701 includes a display area 702 for a preview of an image of data to be printed, and a button 703 for providing a print execution instruction. A list 704 is provided for selecting a printer driver of an image forming apparatus to be a destination of transmission of a job. The list 704 displays a printer driver of each of a plurality of image forming apparatuses installed in the PC 101 by the user. The user selects a desired printer driver from the list 704. A character string 705 can be pressed to display a setting screen of the printer driver selected from the list 704.

FIG. 7B is a diagram illustrating an example of the setting screen of the printer driver, and the user performs print setting in this setting screen. The print setting includes a job output method. The job output method includes "print" and "secure print". The "print" refers to a normal print job, and when the job is transmitted to an image forming apparatus, the image forming apparatus performs printing without requiring input of a password. The "secure print" refers to a job designated to be reserved temporarily in an image forming apparatus and is given a user-designated password. In printing the secure print job reserved in the image forming apparatus, it is necessary for a user to input the given password while selecting this job and providing a print instruction at the operation unit.

In step S604, the application 502 receives the print setting made by the user. In step S605, the application 502 determines whether a print execution instruction is received. If the application 502 determines that the print execution instruction is received (YES in step S605) based on a press of the button 703, the application 502 requests the printer driver 503 corresponding to the selected image forming apparatus to generate data. In step S606, the printer driver 503 generates page description language (PDL) data (print data) based on data such as an image and a document, a document attribute such as a document name, and a print setting. Subsequently, in step S607, information such as a user name is added to the generated PDL data, and the PDL data is transmitted to the image forming apparatus as the print job.

FIG. 8 is a flowchart illustrating processing for inputting a print job from a core system, and this processing is executed by the CPU 401 of the PC 101.

In step S801, the core system displays, on the display device 406, an entry form for the user to input necessary information and receives the input information. The user inputs the necessary information by using the input device 405 such as a pointing device and a keyboard. In step S802, the core system generates document data based on a result of the input. In step S803, the core system determines whether a print execution instruction for the generated print data is received from the user. If the print execution instruction is received (YES in step S803), the processing proceeds to step S804. In step S804, the core system generates, for example, an LPR command (print command) for requesting an image forming apparatus to perform printing based on a protocol such as LPR. In the LPR command, in addition to the identification information of the image forming apparatus for performing printing and the print data, a logic print queue name is designated. In step S805, the core system transmits the generated LPR command (print command) to the image forming apparatus.

Figures 9A, 9B:
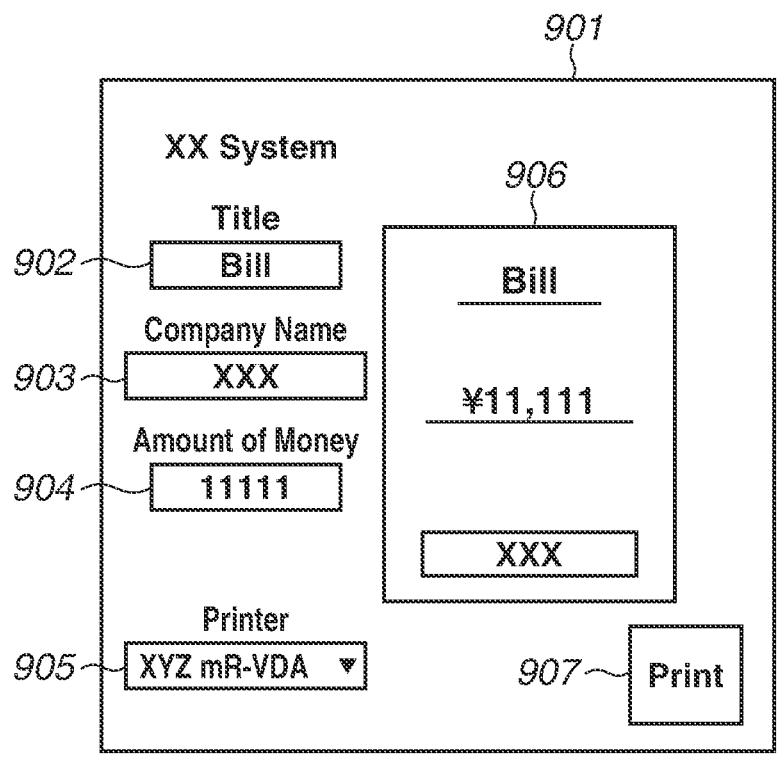
FIGS. 9A and 9B illustrate an example of a screen of the core system and an example of a print job transmission command generated by the core system, respectively.

FIGS. 9A and 9B illustrate an example of a screen of the core system and an example of a print job transmission command (print command) generated by the core system, respectively. FIG. 9A illustrates a core system screen 901. The core system screen 901 includes areas 902, 903, and 904 for inputting necessary information. In the present exemplary embodiment, a title, a company name, and an amount of money are input each as a parameter in the areas 902, 903, and 904, respectively. An area 905 is provided for selecting an image forming apparatus as a print job transmission destination. An area 906 displays an image of the document data reflecting the input information. More specifically, the area 906 displays "Bill" input in the area 902, "XXX" input in the area 903, and "11,111" input in the area 904. A button 907 is used to provide a print execution instruction. The core system generates a command illustrated in FIG. 9B when the button 907 is pressed.

FIG. 9B illustrates an lpr execution command 908. An Internet Protocol (IP) address 909 of an image forming apparatus that is a transmission destination is indicated by using an option of –S. The core system generates a command using the IP address of the image forming apparatus selected in the area 905. A logic print queue name 910 is indicated by using an option of –P. The core system generates a command using a predetermined logic print queue. Although the predetermined logic print queue is used in the present exemplary embodiment, the core system screen 901 may include an area for selecting a logic print queue name so that the logic print queue name can be switched to another one. A path 911 is a path of a file to be transmitted to an image forming apparatus as a print job.

Figure 10:
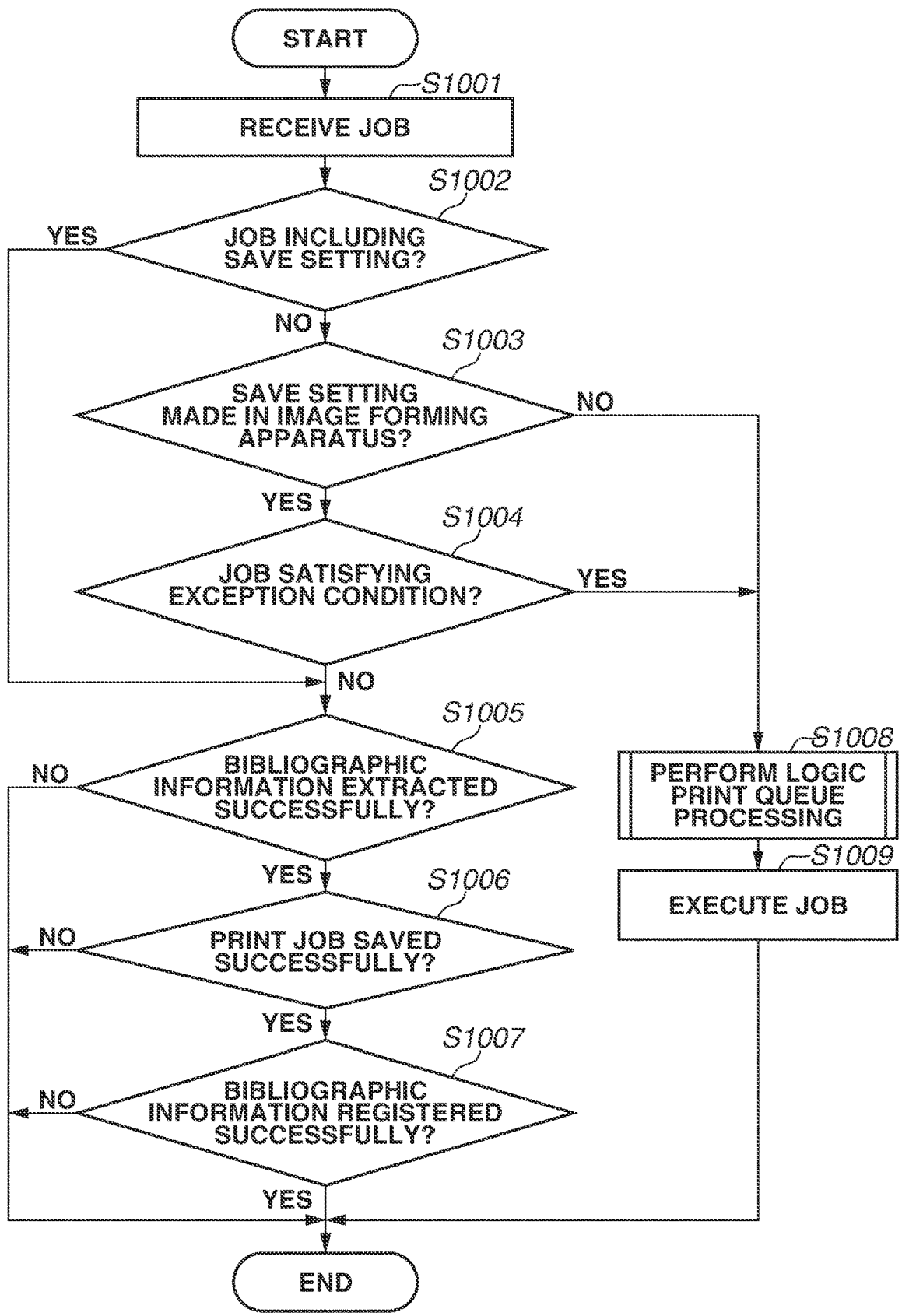
FIG. 10 is a flowchart illustrating save processing of a print job according to a first exemplary embodiment.

FIG. 10 is a flowchart illustrating save processing of a print job in the system software 301, and this save processing is executed by the CPU 202 of the image forming apparatus 102.

In step S1001, the network control unit 306 receives a print job, and transmits the print job to the job management unit 307. In step S1002, the job management unit 307 receives the print job and determines whether the received print job includes a save setting. The job including the save setting is a job for which "Secure Print" is designated as the output method in the setting screen of the printer driver 503. If the print job includes the save setting (YES in step S1002), the processing proceeds to step S1005.

If the print job does not include the save setting (NO in step S1002), the processing proceeds to step S1003. In step S1003, whether a save setting for the print job is made in the image forming apparatus 102 is determined. The save setting for the print job is the setting for enabling the above-described forced reservation function. Enabling/disabling the forced reservation function is set for each image forming apparatus, and the storage control unit 305 stores the setting into a device such as the HDD 205 and the RAM 203. If the save setting for the print job is not made (NO in step S1003), the processing proceeds to step S1008.

If the save setting for the print job is made (YES in step S1003), i.e., if the forced reservation function is enabled, the processing proceeds to step S1004. In step S1004, the job management unit 307 determines whether the print job satisfies an exception condition for forced reservation function. The exception condition is a condition for performing processing other than saving without reserving even if the forced reservation function is enabled in the image forming apparatus. The exception condition is set beforehand by a person such as an administrator, and a single image forming apparatus can include a plurality of settings.

Figure 11:
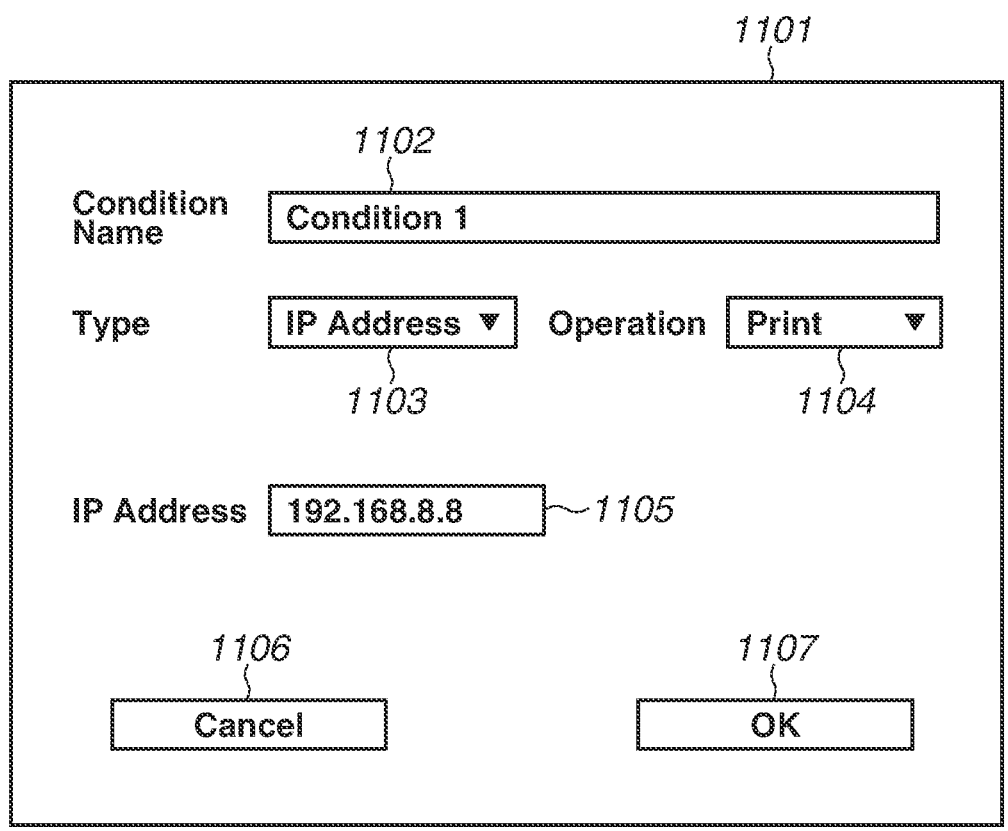
FIG. 11 is a diagram illustrating an example of an exception condition setting screen.

FIG. 11 is a diagram illustrating an example of an exception condition setting screen. This is a screen that can be displayed when an administrator user (hereinafter referred to as the administrator) logs in, and in a case where the forced reservation function is enabled. The present exemplary embodiment is described to use the IP address of a PC having a core system as a condition, and to set an exception condition for printing a job from the PC of a designated IP address without saving the job.

In an exception condition setting screen 1101, an area 1102 is provided for inputting a condition name, and a condition name "Condition 1" is designated in this area. An area 1103 is provided for selecting a type. An exception condition such as an owner name of a print job, an IP address of a print input source (a transmission source), or a transmission protocol (such as LPR and FTP) of a print job is selectable in this area. In FIG. 11, "IP Address" is selected. An area 1104 is provided for selecting processing to be performed on a job that satisfies the condition in the area 1103, and the processing such as printing and cancellation is selectable in this area. In FIG. 11, "Print" is selected. An area 1105 is provided for inputting a specific condition corresponding to the type of the condition. In FIG. 11, since the type is the IP address, an area for inputting the IP address appears, and "192.168.8.8" is designated as the IP address of the core system. A cancel button 1106 is provided for canceling the setting information, and an OK button 1107 is provided for confirming the setting. When the OK button 1107 is pressed, the storage control unit 305 stores the set exception condition into a device such as the HDD 205 and the RAM 203.

If the print job satisfies the exception condition (YES in step S1004), the processing proceeds to step S1008. If the print job does not satisfy the exception condition (NO in step S1004), the job management unit 307 transmits the print job to the data management unit 304. Then, the processing proceeds to step S1005. In step S1005, the data management unit 304 analyzes the print job received from the job management unit 307 and extracts bibliographic information from the print job. If the bibliographic information is extracted successfully (YES in step S1005), the data management unit 304 transmits the print job and the extracted bibliographic information to the storage control unit 305. Then, in step S1006, the storage control unit 305 saves the received print job into the HDD 205. If the received print job is saved successfully (YES in step S1006), the processing proceeds to step S1007. In step S1007, the storage control unit 305 saves (registers) the extracted bibliographic information in association with the user into the HDD 205. If the processing in each of steps S1005, S1006, and S1007 is unsuccessful for a reason such as no free space in the HDD 205, the processing ends. If the extracted bibliographic information is registered successfully (YES in step S1007), the processing ends.

FIG. 12 is a diagram illustrating an example of a bibliographic information table. A bibliographic information table 1201 of a user UserA is illustrated. Each piece of bibliographic information includes a date and time 1202 of input of a print job, an IP address 1203 of an image forming apparatus into which the print job is input, a storage location 1204 of the input print job, a print job name 1205, and a print setting 1206.

If the forced reservation function is not enabled (NO in step S1003) or if the print job satisfies the exception condition (YES in step S1004), the processing proceeds to step S1008. In step S1008, the job management unit 307 performs logic print queue processing to be described below. Subsequently, in step S1009, the job management unit 307 executes the print job. Thus, the save processing for the print job is performed as above.

The present exemplary embodiment employs a mode in which the administrator sets the exception condition beforehand and therefore a job from the core system is printed without being saved. However, the present exemplary embodiment is not limited to this mode. For example, in a case where information that identifies a job to be from the core system is extracted from the print job received by the system software 301, the processing may proceed to step S1008 without determining whether the print job satisfies the exception condition. For example, for a print job transmitted based on the LPR protocol, the processing may proceed to step S1008 without reserving this print job.

Figure 13:
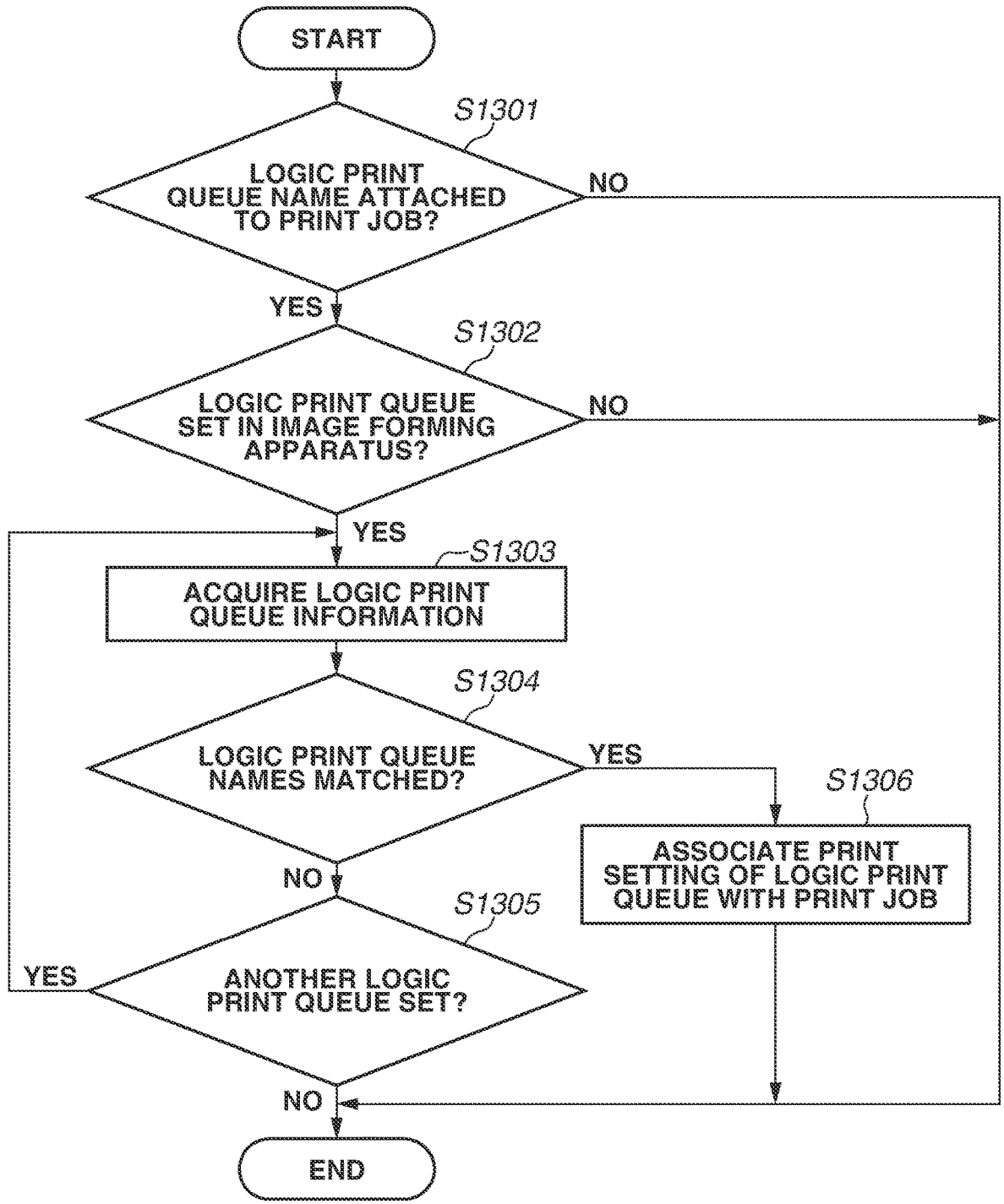
FIG. 13 is a flowchart illustrating logic print queue processing.

FIG. 13 is a flowchart illustrating the logic print queue processing in the system software 301, and this logic print queue processing is executed by the CPU 202 of the image forming apparatus 102.

In step S1301, the job management unit 307 determines whether the logic print queue name is attached to the print job. If the logic print queue name is not attached to the print job (NO in step S1301), the processing ends. If the logic print queue name is attached to the print job (YES in step S1301), the processing proceeds to step S1302. In step S1302, whether a logic print queue is set in the image forming apparatus 102 is determined. The logic print queue is set beforehand by a person such as the administrator, and a single image forming apparatus can include a plurality of settings.

Figure 14:
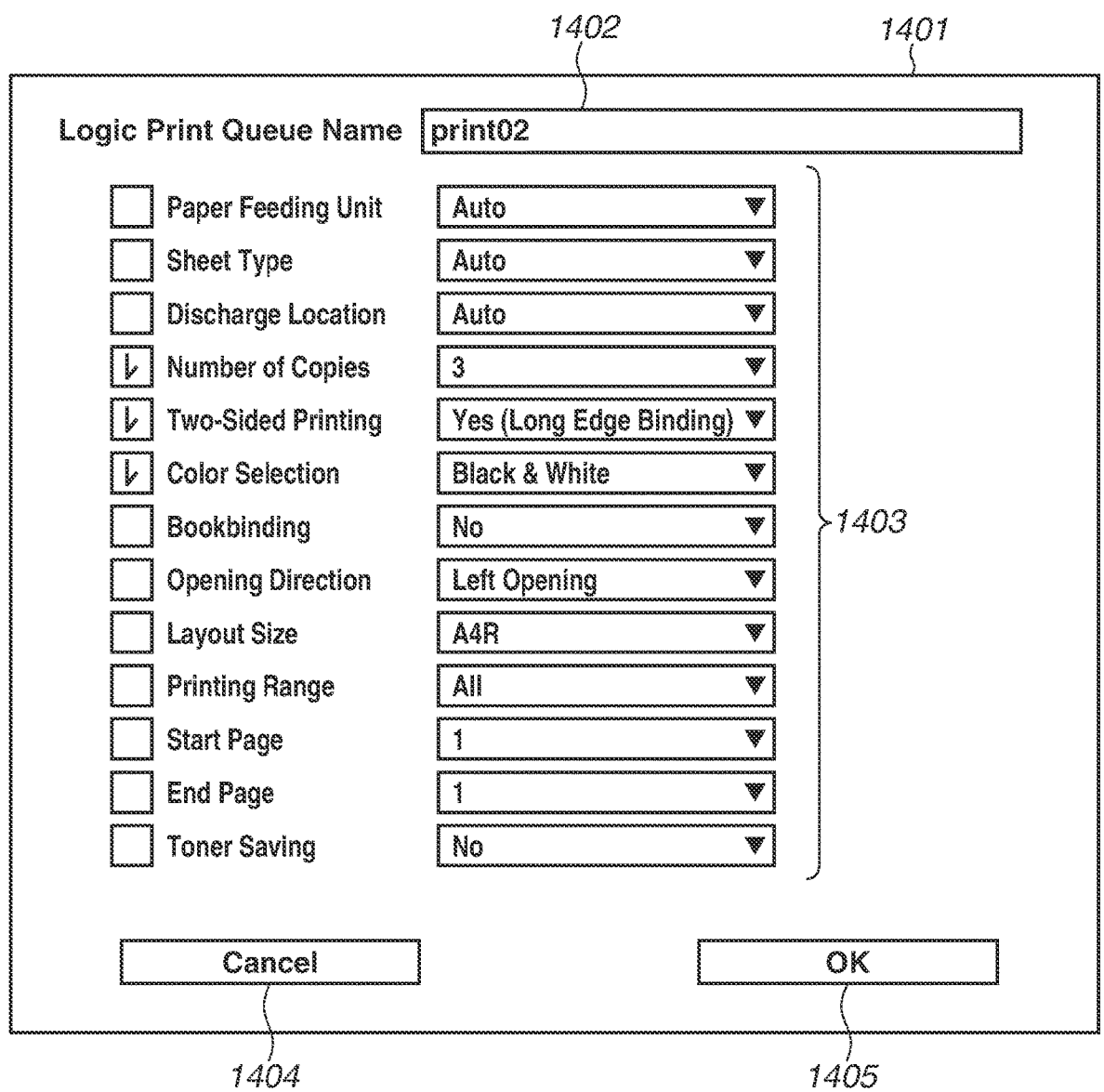
FIG. 14 is a diagram illustrating an example of a setting screen for a logic print queue.

FIG. 14 is a diagram illustrating an example of a setting screen for the logic print queue. In a logic print queue setting screen 1401, an area 1402 is provided for inputting a logic print queue name, and "print02" is designated in this area. An area 1403 is provided for selecting print setting, and an item checked in a check box is to be set. The print setting is not limited to this example. In FIG. 14, 3 copies, two-sided printing (long edge binding), and black and white are designated. A cancel button 1404 is provided for canceling the setting information, and an OK button 1405 is provided for confirming the setting. When the OK button 1405 is pressed, the storage control unit 305 stores the set information as a setting in a logic print queue setting table into a device such as the HDD 205 and the RAM 203.

FIG. 15 is a diagram illustrating an example of the logic print queue setting table. A logic print queue setting table 1501 includes a logic print queue name 1502 and a print setting 1503. Two logic print queues, i.e., a logic print queue having a name of "print01" and a logic print queue having a name of "print02", are set in the present exemplary embodiment. For the logic print queue having the name of "print01", one-sided, 1 copy, and color paper are designated as the print setting, and for the logic print queue having the name of "print02", two-sided, 3 copies, and black and white are designated as the print setting. In this way, the print setting is registered in association with the logic print queue name.

If the logic print queue is not set (NO in step S1302), the processing ends. If the logic print queue is set (YES in step S1302), the processing proceeds to step S1303. In step S1303, logic print queue information set in the image forming apparatus 102 is acquired. Subsequently, in step S1304, a logic print queue name of the acquired logic print queue information and the logic print queue name attached to the print job are compared. If the logic print queue names match with each other as a result of the comparison (YES in step S1304), the processing proceeds to step S1306. In step S1306, the print setting linked to the logic print queue is associated with the print job, and the processing ends. If the logic print queue names do not match with each other as a result of the comparison (NO in step S1304), the processing proceeds to step S1305. In step S1305, whether another logic print queue is set in the image forming apparatus 102 is determined. If the other logic print queue is set in the image forming apparatus 102 (YES in step S1305), the processing shifts to step S1303. If the other logic print queue is not set in the image forming apparatus 102 (NO in step S1305), the processing ends. Thus, the logic print queue processing is performed as above.

According to the present exemplary embodiment, even if the forced reservation function is set, the print job for which the logic print queue name is designated can be output without being reserved based on the print setting corresponding to the designated logic print queue name.

In the first exemplary embodiment, there is described the example in which even if the forced reservation function is enabled, the print job for which the logic print queue name is designated is printed without being reserved based on the print setting of the logic print queue. In a second exemplary embodiment, there will be described a method in which a print job for which a logic print queue name is designated is reserved in a case where the forced reservation function is enabled, and the setting of the logic print queue is saved in association with the print job when reserving the print job.

Figure 16:
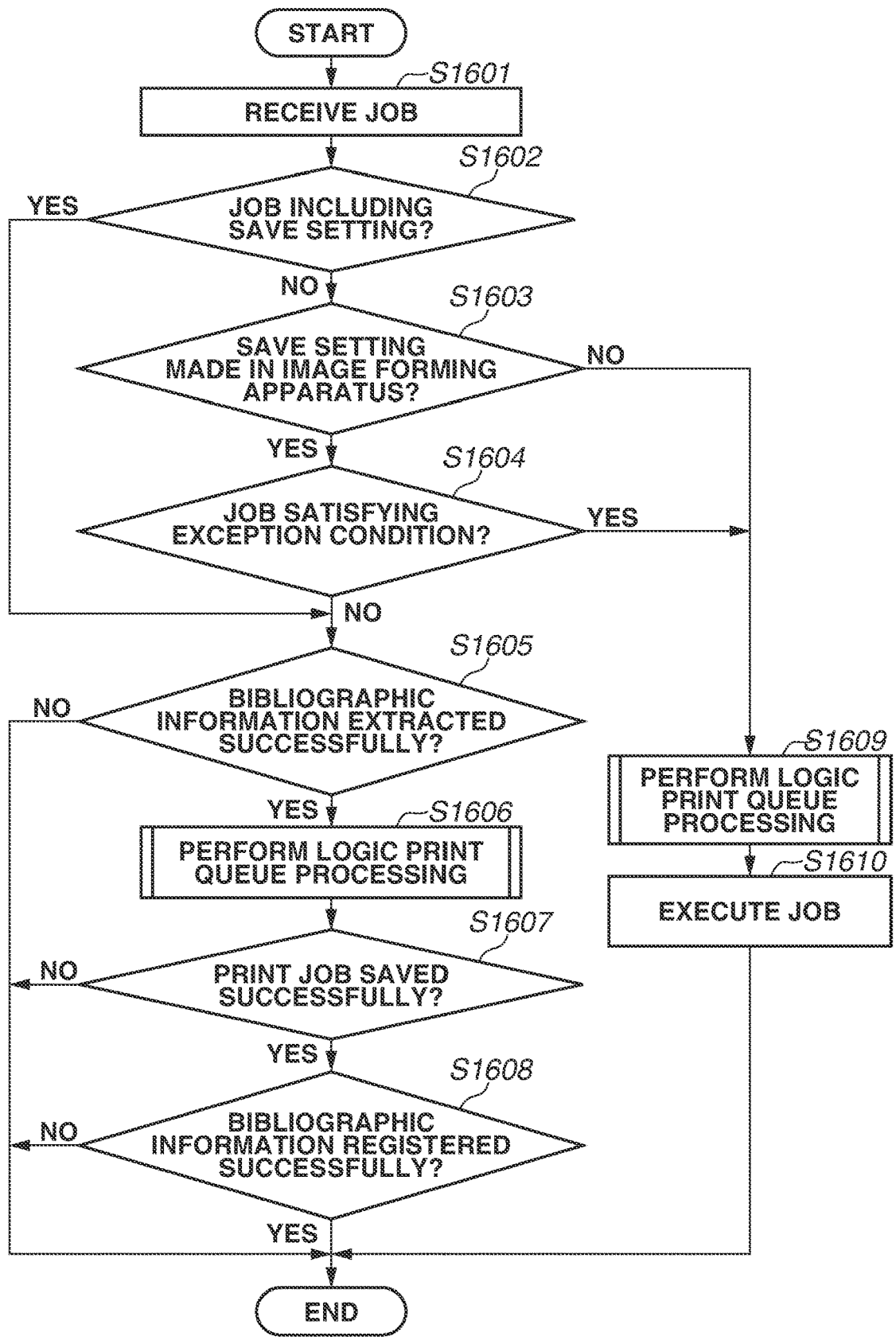
FIG. 16 is a flowchart illustrating save processing for a print job according to a second exemplary embodiment.

The second exemplary embodiment is different from the first exemplary embodiment in that processing in FIG. 16 is performed in place of the processing in FIG. 10. Other points are similar to those of the first exemplary embodiment and will not be described.

FIG. 16 is a flowchart illustrating save processing for a print job in the system software 301, and this save processing is executed by the CPU 202 of the image forming apparatus 102.

In step S1601, the network control unit 306 receives a print job, and transmits the print job to the job management unit 307. In step S1602, the job management unit 307 receives the print job and determines whether the received print job includes a save setting. The job including the save setting is a job for which "secure print" is designated as the output method in the setting screen of the printer driver 503. If the print job includes the save setting (YES in step S1602), the processing proceeds to step S1605. If the print job does not include the save setting (NO in step S1602), the processing proceeds to step S1603. In step S1603, whether the forced reserve function is enabled (i.e., whether the save setting for the print job is made in the image forming apparatus) is determined. If the forced reservation function is not enabled (NO in S1603), the processing proceeds to step S1609. If the forced reservation function is enabled (YES in S1603), the processing proceeds to step S1604. In step S1604, the job management unit 307 further determines whether the print job satisfies an exception condition.

If the print job satisfies the exception condition (YES in step S1604), the processing proceeds to step S1609. If the print job does not satisfy the exception condition (NO in step S1604), the job management unit 307 transmits the print job to the data management unit 304. Then, the processing proceeds to step S1605. In step S1605, the data management unit 304 analyzes the print job received from the job management unit 307 and extracts bibliographic information from the print job.

Further, in step S1606, the data management unit 304 performs the logic print queue processing in FIG. 13. In a case where the print setting corresponding to the logic print queue name is associated with the target print job through the logic print queue processing, the data management unit 304 updates the print setting in the extracted bibliographic information to the print setting associated through the logic print queue processing.

Subsequently, the data management unit 304 transmits the print job and the bibliographic information to the storage control unit 305. In step S1607, the storage control unit 305 saves the received print job into the HDD 205. If the received print job is saved successfully (YES in step S1607), the processing proceeds to step S1608. In step S1608, the storage control unit 305 saves (registers) the extracted bibliographic information in association with the user into the HDD 205. If the processing in each of steps S1605. S1607, and S1608 is unsuccessful for a reason such as no free space in the HDD 205, the processing ends. If the extracted bibliographic information is registered successfully (YES in step S1608), the processing ends.

If the forced reservation function is not enabled (NO in step S1603) or if the print job satisfies the exception condition (YES in step S1604), the processing proceeds to step S1609. In step S1609, the job management unit 307 performs the logic print queue processing in FIG. 13. Subsequently, in step S1610, the job management unit 307 executes the print job. Thus, the save processing for the print job is performed as above.

Then, the saved print job is printed based on the print setting associated with the print job. More specifically, the user inputs authentication information such as a user identification (ID) and a password into the operation unit 207 to be authenticated by the authentication unit 303, and the user logs into the image forming apparatus 102. Subsequently, by an operation of the login user, a list of print jobs that can be printed by the user is displayed on the operation unit 207, and the user selects a print job as a print target from the list, and provides a print instruction. If the print setting registered in association with the logic print queue name as described above is associated with the print job selected as the print target, printing is performed based on this print setting.

According to the present exemplary embodiment, a print job is saved without being immediately printed even if the job is a print job for which a logic print queue name is designated. In this process, if the logic print queue corresponding to the designated logic print queue name is set in the image forming apparatus, the print job is saved based on the print setting of the logic print queue. Thus, the user can output the saved print job based on the print setting of the logic print queue without performing the print setting again.

In the second exemplary embodiment, there is described the example in which, if the print job for which the logic print queue name is designated is received in a case where the forced reservation function is enabled, the print job is reserved in association with the print setting corresponding to the logic print queue name. In a third exemplary embodiment, there will be described a method for saving a job for which a logic print queue name is designated without associating the print setting of the logic print queue name with the job, and printing the saved job by acquiring the print setting of the logic print queue name.

Figure 17:
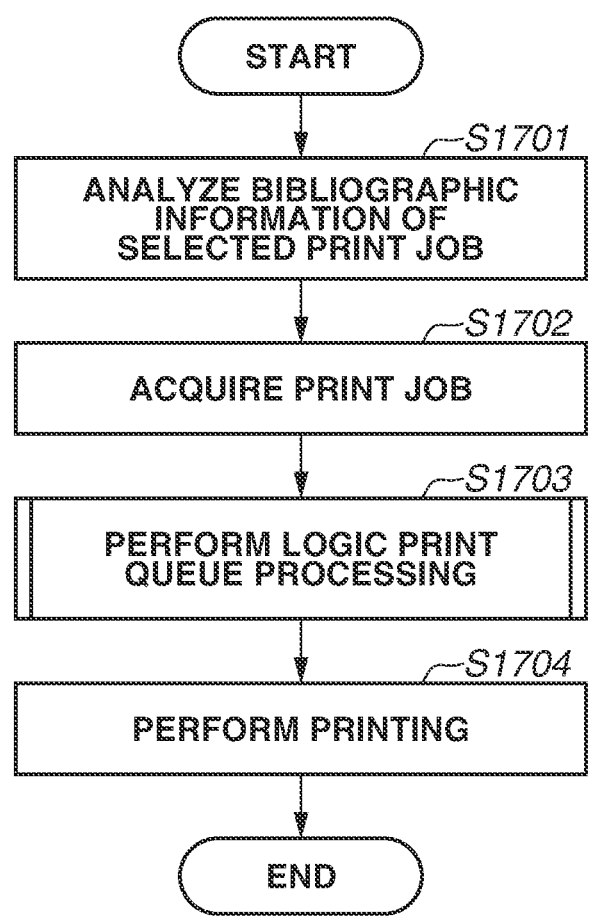
FIG. 17 is a flowchart illustrating print processing for a saved print job according to a third exemplary embodiment.

FIG. 17 is a flowchart illustrating print processing for a saved print job in the system software 301, and this print processing is executed by the CPU 202 of the image forming apparatus 102.

A user inputs authentication information such as a user ID and a password into the operation unit 207 to be authenticated by the authentication unit 303, and the user logs into the image forming apparatus 102. Subsequently, by an operation of the login user, a list of print jobs that can be printed by the user is displayed on the operation unit 207, and the user selects a print job as a print target from the list, and provides a print instruction. This starts the processing in FIG. 17.

In step S1701, the job management unit 307 analyzes the bibliographic information of the print job selected as the print target by the user, and transmits a request for acquisition of the print job to the data management unit 304. In step S1702, the data management unit 304 acquires the target print job. In step S1703, the data management unit 304 performs the logic print queue processing in FIG. 13 on the acquired print job. In a case where the print setting corresponding to the logic print queue name is associated with the target print job through the logic print queue processing, the data management unit 304 updates the print setting in the bibliographic information to the print setting associated through the logic print queue processing. Subsequently, the data management unit 304 acquires the designated print job from the HDD 205 via the storage control unit 305, and transmits, via the job management unit 307, the print job to the job control unit 308 together with the updated print setting. In step S1704, the job control unit 308 performs printing using the printer 211 based on the received print job. Thus, the print processing is performed as above.

According to the present exemplary embodiment, for a print job received in a case where the forced reservation function is enabled, the print job is saved without being immediately printed even if this job is a print job for which a logic print queue name is designated. When the saved print job is output, the print job is printed based on the print setting corresponding to the logic print queue name designated for the print job. Thus, the user can output the print job based on the print setting of the logic print queue without performing the print setting again.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-137628, filed Jul. 23, 2018, which is hereby incorporated by reference herein in its entirety.

What is claimed is:

1. A printing apparatus comprising:
   at least a memory storing instructions; and
   at least a processor executing the instructions to:
   manage a save setting indicating whether a storing function for storing received print data until receipt of a print instruction for the received print data is enabled;
   register one or more print queues in the printing apparatus, wherein each print queue is usable as a printer name set in a print request;
   manage a respective print setting associated with each print queue;
   receive a print request including at least print data;
   store the print data included in the received print request by using the storing function, in a case where the save setting indicates that the storing function is enabled and the received print request does not satisfy a predetermined condition; and
   print the print data included in the received print request without storing the print data by using the storing function in a case where the save setting indicates that the storing function is enabled and the received print request satisfies the predetermined condition,
   wherein the printing based on the satisfaction of the predetermined condition is performed based on a managed print setting associated with a print queue which has been set as a printer name in the received print request and is one of the registered one or more print queues, and
   wherein the predetermined condition includes a condition identifying communication information of a print request.

2. The printing apparatus according to claim 1, wherein the communication information in the condition is an internet protocol (IP) address of a transmission source of a print request or a transmission protocol of the print data request.

3. The printing apparatus according to claim 1, wherein the stored print data by using the storing function is printed in response to receipt of a print instruction on an operation device of the printing apparatus.

4. The printing apparatus according to claim 1,
wherein the communication information in the condition is a Line Printer Remote (LPR) protocol as a transmission protocol of the print request, and
wherein the one of the one or more print queues is set in the received print request using an option for designating a printer name by the LPR protocol.

5. A control method for a printing apparatus comprising:
managing a save setting indicating whether a storing function for storing received print data until receipt of a print instruction for the received print data is enabled;
registering one or more print queues in the printing apparatus, wherein each print queue is usable as a printer name set in a print request;
managing a respective print setting associated with each print queue;
receiving a print request including at least the print data;
storing the print data included in the received print request by using the storing function, in a case where the save setting indicates that the storing function is enabled and the received print request does not satisfy a predetermined condition; and
printing the print data included in the received print request without storing the print data by using the storing function in a case where the save setting indicates that the storing function is enabled and the received print request satisfies the predetermined condition,
wherein the printing based on the satisfaction of the predetermined condition is performed based on a managed print setting associated with a print queue which has been set as a printer name in the received print request and is one of the registered one or more print queues, and
wherein the predetermined condition includes a condition identifying communication information of a print request.

6. The control method according to claim 5, wherein the communication information in the condition is an internet protocol (IP) address of a transmission source a print request or a transmission protocol of the print request.

7. The control method according to claim 5, the stored print data by using the storing function is printed in response to receipt of a print instruction on an operation device of the printed apparatus.

8. The control method according to claim 5,
wherein the communication information in the condition is a Line Printer Remote (LPR) protocol as a transmission protocol of the print request, and
wherein the one of the one or more print queues is set in the received print request using an option for designating a printer name by the LPR protocol.

9. A non-transitory computer readable storage medium on which is stored a computer program for making a computer execute a control method for a printing apparatus, the control method comprising:
managing a save setting indicating whether a storing function for storing received print data until receipt of a print instruction for the received print data is enabled;
registering one or more print queues in the printing apparatus, wherein each print queue is usable as a printer name set in a print request;
managing a respective print setting associated with each print queue;
receiving a print request including at least the print data;
storing the print data included in the received print request by using the storing function, in a case where the save setting indicates that the storing function is enabled and the received print request does not satisfy a predetermined condition; and
printing the print data included in the received print request without storing the print data by using the storing function in a case where the save setting indicates that the storing function is enabled and the received print request satisfies the predetermined condition,
wherein the printing based on the satisfaction of the predetermined condition is performed based on a managed print setting associated with a print queue which has been set as a printer name in the received print request and is one of the registered one or more print queues, and
wherein the predetermined condition includes a condition identifying communication information of a print request.

10. The non-transitory computer readable storage medium according to claim 9, wherein the communication information in the condition is an internet protocol (IP) address of a transmission source of a print request or a transmission protocol of the print request.

11. The non-transitory computer readable storage medium according to claim 9, wherein the stored the print data by using the storing function is printed in response to receipt of a print instruction on an operation device of the apparatus.

12. The non-transitory computer readable storage medium according to claim 9,
wherein the communication information in the condition is a Line Printer Remote (LPR) protocol as a transmission protocol of the print request, and
wherein the one of the one or more print queues is set in the received print request using an option for designating a printer name by the LPR protocol.

* * * * *